United States Patent
Sun et al.

(10) Patent No.: US 10,348,464 B2
(45) Date of Patent: Jul. 9, 2019

(54) METHOD, APPARATUS, AND SYSTEM FOR COMP-BASED RESOURCE ALLOCATION

(71) Applicant: Alcatel Lucent, Boulogne Billancourt (FR)

(72) Inventors: Huan Sun, Shanghai (CN); Zhilan Xiong, Shanghai (CN); Min Zhang, Swindon (GB); Matthew Baker, Canterbury (GB)

(73) Assignee: Alcatel Lucent, Nozay (FR)

( * ) Notice: Subject to any disclaimer, the term of this patent is extended or adjusted under 35 U.S.C. 154(b) by 153 days.

(21) Appl. No.: 15/129,536

(22) PCT Filed: Mar. 23, 2015

(86) PCT No.: PCT/IB2015/000517
§ 371 (c)(1),
(2) Date: Sep. 27, 2016

(87) PCT Pub. No.: WO2015/145254
PCT Pub. Date: Oct. 1, 2015

(65) Prior Publication Data
US 2017/0163393 A1 Jun. 8, 2017

(30) Foreign Application Priority Data
Mar. 28, 2014 (CN) .......................... 2014 1 0124563

(51) Int. Cl.
*H04L 5/00* (2006.01)
*H04B 7/024* (2017.01)
*H04W 24/10* (2009.01)

(52) U.S. Cl.
CPC ........... *H04L 5/0035* (2013.01); *H04B 7/024* (2013.01); *H04W 24/10* (2013.01)

(58) Field of Classification Search
CPC ....... H04L 5/0032; H04B 7/024; H04W 24/10
See application file for complete search history.

(56) References Cited

U.S. PATENT DOCUMENTS

2013/0114427 A1  5/2013  Maattanen et al.
2013/0196678 A1  8/2013  Liu et al.
(Continued)

FOREIGN PATENT DOCUMENTS

CN  103001678  3/2013
CN  103249150  8/2013
(Continued)

OTHER PUBLICATIONS

Renesas Mobile Europe Ltd., "Feedback operation for coordinated multi-point operation," 3$^{rd}$ Generation Partnership Project (3GPP), 3GPP TSG-RAN WG1 Meeting #67, R1-113892, 4 pages, XP050561972, San Francisco, USA, Nov. 14-18, 2011.

(Continued)

*Primary Examiner* — Kent K Krueger
(74) *Attorney, Agent, or Firm* — Fay Sharpe LLP

(57) ABSTRACT

The present invention provides a method, in a first node, for performing Co MP-based resource allocation for a second node, the method comprising steps of: a. selecting at least one Co MP hypothesis from among a plurality of Co MP hypotheses based on measurement theses based on measurement information reported by a second node; b. transmitting a resource allocation request to the second node; c. receiving feedback information from the second node with response to the resource allocation request, and performing a corresponding operation. According to the method of the present embodiment, the CoMP transmission performance can be enhanced, and the second node has more freedom to select a CoMP hypothesis more suitable for the second node based on its own status.

15 Claims, 6 Drawing Sheets

(56) References Cited

U.S. PATENT DOCUMENTS

| | | | |
|---|---|---|---|
| 2014/0192744 A1 | 7/2014 | Zhou et al. | |
| 2015/0171984 A1 | 6/2015 | Jitsukawa et al. | |
| 2015/0312903 A1* | 10/2015 | Prasad .................. | H04B 7/024 |
| | | | 370/329 |
| 2016/0036571 A1* | 2/2016 | Park ...................... | H04B 7/024 |
| | | | 370/330 |

FOREIGN PATENT DOCUMENTS

| | | |
|---|---|---|
| GB | 2 496 178 A | 5/2013 |
| JP | 2013-539930 | 10/2013 |
| WO | WO 2013/141781 A1 | 9/2013 |
| WO | WO 2014/033772 | 3/2014 |

OTHER PUBLICATIONS

International Search Report for PCT/IB2015/000517 dated Sep. 22, 2015.
Alcatel-Lucent, et al., "Signalling Details and Procedures Supporting eCoMP", 3GPP TSG RAN WG1 #76b, R1-141251, Mar. 31-Apr. 4, 2014.
Nsn, et al, "Inter-eNB signaling design for eCoMP", 3GPP Tsg-Ran WG1 #76b, R1-141538, Mar. 31 — Apr. 4, 2014 Ci.
Qualcomm, "Parameters for backhaul signaling," 3GPP TSG-RAN WG1, Meeting #76bis, R1-141445, Shenzhen, China, Mar. 31-Apr. 4, 2014.

* cited by examiner

METHOD, APPARATUS, AND SYSTEM FOR COMP-BASED RESOURCE ALLOCATION

FIELD OF THE INVENTION

The present invention relates to the field of communication technologies, and more specifically relates to a method, apparatus, and system for CoMP-based resource allocation.

BACKGROUND OF THE INVENTION

At present, the concept of CoMP (Coordinated Multiple Points) transmission has been proposed. However, in an actual application scenario, since the backhaul link performance is usually not ideal and each node in the same CoMP cluster always has a different status, different nodes have different acceptability for coordinated transmission. This causes application of coordinated transmission very complex. Therefore, the prior art cannot provide a specific implementation manner of CoMP transmission till now.

SUMMARY OF THE INVENTION

An objective of the present invention is to provide a method, apparatus and system for CoMP-based resource allocation based on.

According to one aspect of the present invention, there is provided a method, in a first node, for CoMP-based resource allocation for a second node, wherein the first node and the second node belong to the same CoMP cluster, the method comprising steps of:

a. selecting at least one CoMP hypothesis from among a plurality of CoMP hypotheses based on measurement information reported by the second node, wherein all or a part of CoMP hypotheses in the plurality of CoMP hypotheses define dimensional condition(s) when the second node supports CoMP;

b. transmitting a resource allocation request to the second node, wherein the resource allocation request is for indicating the at least one CoMP hypothesis available for the second node to select and resource information corresponding to all or a part of CoMP hypotheses in the at least one CoMP hypothesis, respectively;

c. receiving feedback information from the second node with response to the resource allocation request, and performing a corresponding operation, wherein the feedback information indicates a CoMP hypothesis selected by the second node.

According to another aspect of the present invention, there is further provided a method, in a second node, for determining CoMP-based resource allocation with assistance of a first node, wherein the first node and the second node belong to the same CoMP cluster, the method comprising steps of:

A. receiving a resource allocation request, with respect to measurement information transmitted by the second node, fed back by the first node, wherein the resource allocation request is for indicating at least one CoMP hypothesis available for the second node to select and resource information corresponding to all or a part of CoMP hypotheses in the at least one CoMP hypothesis, respectively, and all or the part of CoMP hypotheses in the at least one CoMP hypothesis defining dimensional condition(s) when the second node supports CoMP;

B. selecting a CoMP hypothesis based on the resource information and/or status information of the second node;

C. transmitting, to the first node, feedback information with respect to the resource allocation request, wherein the feedback information indicates the CoMP hypothesis selected by the second node.

According to a further aspect of the present invention, there is provided a first apparatus, in a first node, for CoMP-based resource allocation for a second node, wherein the first node and the second node belong to the same CoMP cluster, the first apparatus comprising:

a first selecting module configured to select at least one CoMP hypothesis from among a plurality of CoMP hypotheses based on measurement information reported by the second node, wherein all or a part of CoMP hypotheses in the plurality of CoMP hypotheses define dimensional condition(s) when the second node supports CoMP;

a first transmitting module configured to transmit a resource allocation request to the second node, wherein the resource allocation request is for indicating the at least one CoMP hypothesis available for the second node to select and resource information corresponding to all or a part of CoMP hypotheses in the at least one CoMP hypothesis, respectively;

a first receiving module configured to receive feedback information from the second node with response to the resource allocation request, and perform a corresponding operation, wherein the feedback information indicates a CoMP hypothesis selected by the second node.

According to a still aspect of the present invention, there is further provided a second apparatus, in a second node, for determining CoMP-based resource allocation with assistance of a first node, wherein the first node and the second node belong to the same CoMP cluster, the second apparatus comprising:

a third receiving module configured to receive a resource allocation request, with respect to measurement information transmitted by the second node, fed back by the first node, wherein the resource allocation request is for indicating at least one CoMP hypothesis available for the second node to select and resource information corresponding to all or a part of CoMP hypotheses in the at least one CoMP hypothesis, respectively, and all or the part of CoMP hypotheses in the at least one CoMP hypothesis defining dimensional condition(s) when the second node supports CoMP;

a second selecting module configured to select a CoMP hypothesis based on the resource information and/or status information of the second node;

a second transmitting module configured to transmit, to the first node, feedback information with respect to the resource allocation request, wherein the feedback information indicates the CoMP hypothesis selected by the second node.

Compared with the prior art, the present invention has the following advantages: 1) all or a part of a plurality of pre-set CoMP hypotheses define dimensional condition(s) when the second node supports CoMP, such that the first node may select one or more CoMP hypotheses more suitable for the second node from among the plurality of CoMP hypotheses based on the measurement signal reported by the second node, and further, it is more reasonable for resource allocation by performing resource allocation for the one or more CoMP hypotheses; 2) the second node may select a CoMP hypothesis, from among the one or more CoMP hypotheses, which is most suitable for the second node to perform coordinated transmission, based on the status information of the second node and influences of different CoMP hypotheses on the performance of the second node, thereby enhancing the performance of the CoMP transmission; 3) when the second node reports new measurement information resulting from re-measurement to the first node, the first node may re-select one or more CoMP hypotheses available for the second node to select, so as to update the CoMP hypotheses when the second node is performing a coordinated transmission, thereby avoiding deterioration of the CoMP transmission performance caused by change of the status of the second node; 4) the second node may provide, to the first node, desired CoMP hypotheses and resource information of neighboring cells, while the first node may synthesize the CoMP hypotheses and resource information provided by a plurality of second nodes so as to determine CoMP hypotheses and resource information for respective second nodes, respectively, such that the entire communication system can achieve a better resource scheduling.

BRIEF DESCRIPTION OF THE ACCOMPANYING DRAWINGS

Other features, objectives and advantages of the present invention will become more apparent through reading the detailed description of the non-limitative embodiments with reference to the accompanying drawings.

Same or similar reference numerals in the accompanying drawings represent same or similar components.

DETAILED DESCRIPTION OF THE PREFERRED EMBODIMENTS

Hereinafter, the present invention will be described in further detail with reference to the accompanying drawings.

Figure 1:
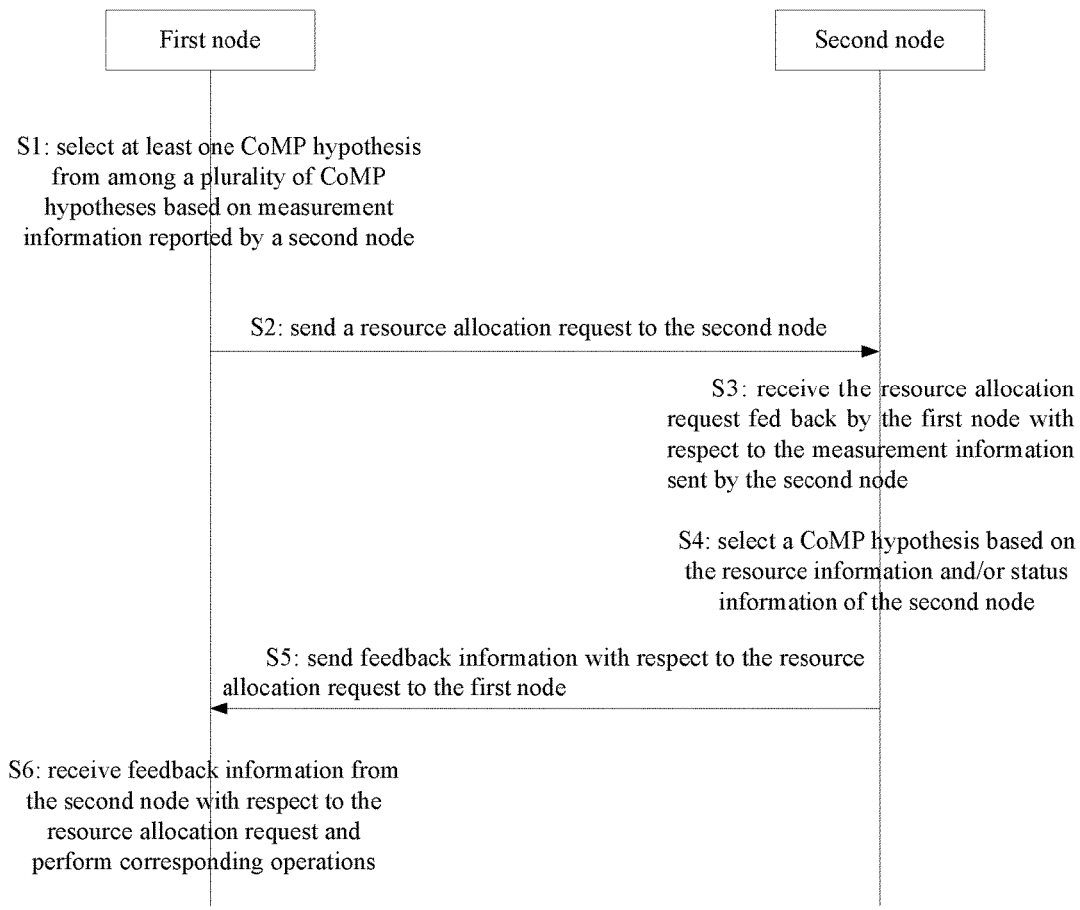
FIG. 1 shows a schematic flow diagram of a method for CoMP-based resource allocation according to one embodiment of the present invention.

FIG. 1 shows a flow diagram of a method for CoMP-based resource allocation according to one embodiment of the present invention.

Herein, the method according to this embodiment is mainly implemented through a first node and a second node, wherein the first node and the second node belong to a same CoMP cluster. Herein, the first node is a node initiating coordinated transmission; in a centralized CoMP network architecture, the first node including, but not limited to a central node (CN) of the centralized CoMP network architecture; in a distributed CoMP network architecture, the first node may be any node in the distributed network. The second node is a node accepting the coordinated transmission initiated by the first node; in a centralized CoMP network architecture, the second node may be any node except the central node; in a distributed CoMP network architecture, the second node may be any node except the first node in the distributed network.

Preferably, the network where the first node and the second node located in are LTE-A (LTE-Advanced) network; more preferably, in the centralized CoMP network architecture, the second node may be eNB (evolved Node B) in the LTE-A network; in the distributed CoMP network architecture, both of the first node and second node may be eNB (evolved Node B) in the LTE-A network.

It should be noted that because nodes within the same cluster are unchanged in a centralized CoMP network architecture, the CoMP cluster where the first node and the second node are located may be initiated and established by the first node to the second node before the following step S1, or may be already existent; because nodes within the same cluster are changing in a distributed CoMP network architecture, the CoMP cluster where the first node and the second node are located are initiated and established by the first node to the second node before the following step S1.

It should be noted that the nodes and network are only examples. Other existing or future possibly emerging nodes and networks, if applicable to the present invention, should also be included within the protection scope of the present invention, which are incorporated here by reference.

The method according to this embodiment comprises step S1, step S2, step S3, step S4, step S5, and step S6.

In step S1, a first node selects at least one CoMP hypothesis from among a plurality of CoMP hypotheses based on measurement information reported by a second node within a same CoMP cluster.

Herein, the measurement information includes any measurement information reported by the second node and associated with communication quality of the second node; for example, CSI (channel state information) measurement information reported by the second node, RSRP (reference signal receiving power) measurement information, BM (benefit metric) measurement information, etc.

Herein, the plurality of CoMP hypotheses are predetermined a plurality of hypotheses for configuring CoMP transmission. Preferably, all or a part of CoMP hypotheses in the plurality of CoMP hypotheses define dimensional condition(s) when the second node supports CoMP.

Preferably, when a part of CoMP hypotheses in the plurality of CoMP hypotheses define dimensional condition(s) when the second node supports CoMP, the other part of CoMP hypotheses in the plurality of CoMP hypotheses may include CoMP hypotheses indicating that coordinated transmission is not performed currently. For example, index "0000" is used to identify a CoMP hypothesis indicating that coordinated transmission is not performed currently.

More preferably, when a part of CoMP hypotheses in the plurality of CoMP hypotheses define the dimensional condition(s) when the second node supports CoMP, the other part of CoMP hypotheses in the plurality of CoMP hypotheses may also include CoMP hypotheses indicating that coordinated transmission is irrelevant to dimensional condition(s). For example, index "0001" may be used to identify such CoMP hypothesis: the second node supports CoMP unconditionally, i.e., the second node's support to coordinated transmission is irrelevant to dimensional condition(s).

Herein, the dimensional condition(s) when the second node supports CoMP include any limitation of the dimension when the second node supporting CoMP; preferably, the dimensional condition(s) when the second node supports CoMP include at least one of the following:

1) the second node supports CoMP on designated dimension(s).

Herein, the designated dimension includes any dimension that might influence the CoMP transmission performance, e.g., spatial dimension, temporal dimension, frequency dimension, power dimension, etc. More specifically, the dimension may be represented as beam group, period of time, sub-band group, power level, etc.

Preferably, the second node may support CoMP on two or more designated dimensions. For example, the second node supports CoMP on temporal dimension, frequency dimension and power dimension.

2) the second node supports CoMP with partial scope(s) of designated dimensions.

Herein, the partial scope indicates a partial scope in the entire designated dimension. For example, for the spatial dimension, it may be represented as a part of beam groups among all beam groups; for the time dimension, it may be represented as a part of period of time within the entire period of time; for the frequency dimension, it may be represented as a part of sub-band group within the entire sub-band group; and for the power dimension, it may be represented as a part of particular power level among all power levels, etc.

Preferably, the second node may support CoMP within partial scopes of two or more designated dimensions.

For example, the second node supports CoMP within a part of beam groups of the spatial dimension and a part of period of time of the time dimension.

It should be noted that the above dimension conditions 1) and 2) may exist simultaneously. In other words, the second node may support CoMP within the entire scopes of some designated dimensions and support CoMP within partial scope(s) of some other designated dimensions. For example, it supports CoMP in the entire period of time, and supports CoMP in a part of sub-band groups.

Herein, possible situations like occurring when the first node selects CoMP hypotheses include, but limited to:

1) the first node determines that the second node is currently not suitable for coordinated transmission based on the measurement information reported by the second node; then, the first node selects a CoMP hypothesis, from among a plurality of CoMP hypotheses, which is used for indicating that coordinated transmission is not performed currently.

For example, the first node determines that the current channel state of the second node is not suitable for performing coordinated transmission based on the channel status information reported by the second node; then the first node selects the index "0000" from among a plurality of CoMP hypotheses, the CoMP hypothesis identified by the index "0000" being for indicating that coordinated transmission is not performed currently.

2) the first node determines that the second node is currently suitable for coordinated transmission based on the measurement information reported by the second node. This situation further includes the following possibilities:

a) the first node determines that the second node may support coordinated transmission unconditionally based on the measurement information reported by the second node; then the first node selects a CoMP hypothesis for indicating unconditional support for the CoMP from a plurality of CoMP hypotheses.

For example, the first node determines that the current load of the second node is very light and the channel condition is very good based on the measurement information reported by the second node, then the first node selects the index "0001" from among a plurality of CoMP hypotheses, the CoMP hypothesis identified by the index "0001" is for indicating unconditional support for the coordinated transmission.

b) the first node determines that the performance may be relatively good in a part of dimensions and/or partial scope(s) of dimension(s) when performing coordinated transmission with the second node, based on the measurement information reported by the second node; then the first node selects at least one CoMP hypothesis corresponding to the determined part of dimensions and/or partial scope(s) of the dimension from among the plurality of CoMP hypotheses.

For example, the first node determines based on the measurement information reported by the second node that the dimension with a better performance when performing coordinated transmission with the second node is the temporal dimension; then the first node selects a CoMP hypothesis for indicating support for CoMP on the temporal dimension from among the plurality of CoMP hypotheses.

For another example, the first node determines, based on the measurement information reported by the second node, that the performance is better when performing coordinated transmission with the second node under the condition of a part of period of time, a part of sub-band groups, and a combination of a part of period of time and a part of sub-band groups; then the first node selects indexes "0010," "0011" and "0110" from among a plurality of CoMP hypotheses; wherein the CoMP hypothesis identified by index "0010" is for indicating that the second node supports CoMP within a part of period of time at the temporal dimension, the CoMP hypothesis identified by the index "0011" is for indicating that the second node supports CoMP within a part of sub-band groups at the frequency dimension, and the CoMP hypothesis identified by the index "0110" is for indicating that the second node supports CoMP within a part of period of time at the temporal dimension and a part of sub-band groups at the frequency dimension.

It should be noted that the designated dimensions in the CoMP hypotheses should be corresponding to a part of dimensions under this situation. For example, if it is determined that the performance on spatial dimension is relatively good, then the dimensional condition defined by the CoMP hypothesis is supporting CoMP on the beam group; however, partial scope(s) of designated dimension(s) in the CoMP hypothesis only indicates that the CoMP is supported not in the entire scope of the dimension, but only partial scope(s) therein; in fact, in a CoMP hypothesis, it might not specifically define which partial scope specifically refers to. However, in this situation, the partial scope determined by the first node may be a specific numerical value, e.g., a specific time period, etc.

Preferably, the above implementation manner a) and implementation manner b) may be combined. For example if the first node determines, based on the measurement information reported by the second node, that the second node likely supports CoMP unconditionally, and the second node also has a possibility of supporting CoMP better in a part of dimensions or partial scope(s) of dimension(s), the first node may select a CoMP hypothesis for indicating unconditional support for the CoMP from among a plurality of CoMP hypotheses and one or more CoMP hypotheses defining the dimensional condition(s) when the second node supports CoMP.

Preferably, for the above scenario 2), although the first node determines that the second node is currently suitable for coordinated transmission based on the measurement information reported by the second node, the first node may also select a CoMP hypothesis (e.g., selecting the index "0000") for indicating that coordinated transmission is not performed currently while selecting one or more CoMP hypotheses suitable for coordinated transmission from among a plurality of CoMP hypotheses, such that when the second node determines that it currently does not perform coordinated transmission based on its own information, it may select a CoMP hypothesis for indicating that coordinated transmission is not performed currently so as to feed back to the first node. More preferably, the first node may decide, based on whether the second node is configured in default with a CoMP hypothesis indicating that coordinated transmission is not performed currently, whether the CoMP hypothesis indicating that coordinated transmission is not performed currently should be selected and provided to the second node. For example, if the second node currently already has a default index "0000" (the first node may determine whether the second node has the default index based on the default configuration of the entire communication system), then the first node might not select the default index "0000"; if the second node currently does not have a default index "0000," then the first node also selects the default index and provides it to the second node while selecting other index.

It should be noted that the above example is only for better illustrating the technical solution of the present invention, not intended to limit the present invention. Those skilled in the art should understand that any implementation manner of selecting at least one CoMP hypothesis from among a plurality of CoMP hypotheses based on the measurement information reported by the second node in the same CoMP cluster should be included within the scope of the present invention.

In step S2, the first node sends a resource allocation request to the second node.

Herein, the resource allocation request is used for requesting allocation of resources to the second node, wherein the resource allocation request is for indicating the at least one CoMP hypothesis available for the second node to select and resource information corresponding to all or a part of CoMP hypotheses in the at least one CoMP hypothesis, respectively.

As a preferred solution, in the present embodiment, the resource allocation request may include, but not limited to:

1) identification information of the first node.
2) identification information of the second node or receiving cell (target cell).
3) index information of at least one CoMP hypothesis available for the second node to select.
4) resource information corresponding to all or a part of CoMP hypotheses among the at least one CoMP hypothesis available for the second node to select.

Herein, the resource information includes any information related to resource allocation for coordinated transmission. Preferably, the resource information includes resource block information. More preferably, for a CoMP hypothesis available for the second node to select, if it has a dimensional condition and the dimensional condition includes that the second node supports CoMP within partial scope(s) of designated dimension(s), then resource information may also include a specific indication of the partial scope(s). More preferably, the specific indication may limit the specific range value. For example, the CoMP hypothesis corresponding to the index "0010" selected by the first node limits that the second node supports CoMP within a part of period of time at the temporal dimension, then the resource information includes a specific time scope of the part of period of time limited by the CoMP hypothesis; moreover, the specific indication may limit the specific number of resources and/or resource number ratio. For example, the CoMP hypothesis corresponding to the index "0011" selected by the first node limits that the second node supports CoMP within a part of sub-bands at the frequency dimension, then the specific indication of the part of sub-band group included in the resource information may be: the number of supported or muted sub-band groups, e.g., muting 3 sub-band groups, or the radio of the supported or muted sub-band groups to all sub-band groups, e.g., 3/9, etc.

5) Average gains generated, for the CoMP cluster, by all or a part of CoMP hypotheses in the at least one CoMP hypothesis available for the second node to select, respectively.

In step S3, the second node receives a resource allocation request fed back by the first node with respect to the measurement information sent by the second node.

In step S4, the second node selects a CoMP hypothesis based on the resource information and/or status information of the second node.

Herein, the status information includes any information for indicating a current status of the second node.

Preferably, the status information includes, but not limited to:

1) load condition of the second node;
2) buffer area status of a second node buffer area;
3) active user amount of the second node;
4) CoMP processing status of the second node.

Specifically, the scenario likely occurring when the second node selects a CoMP hypothesis based on the resource information and/or status information of the second node includes, but not limited to:

1) if the second node determines that it is currently not suitable for coordinated transmission only based on its status information, then the second node selects a CoMP hypothesis for indicating that the second node currently declines to perform coordinated transmission.

For example, when the second node determines, bases on its status information, if it is currently in an overload status and no resource is available for coordinated transmission, the second node selects the index "0000" for the CoMP hypothesis indicating that the second node currently declines coordinated transmission.

For another example, if the second node determines, based on its status information, that it is currently processing other resource allocation request, the second node selects the index "0000" for the CoMP hypothesis indicating that the second node currently declines coordinated transmission.

It should be noted that if the second node sets in default a CoMP hypothesis (hereinafter referred to as the default CoMP hypothesis) indicating that the second node currently declines coordinated transmission, then even the optional CoMP hypothesis provided by the first node does not include the default CoMP hypothesis, the second node can still directly select the default CoMP hypothesis in the case of determining that the CoMP is currently not supported. In other words, in step S4, the CoMP hypothesis selected by the second node may come from the at least one CoMP hypothesis provided by the first node or from the default CoMP hypothesis; if the second node does not have the default CoMP hypothesis, then the CoMP hypotheses selected by the second node all come from the at least one CoMP hypothesis provided by the first node (in this case, the first node will generally provide the default CoMP hypothesis).

Preferably, the default CoMP hypothesis may be divided into a plurality of sub-CoMP hypotheses according to the reasons why the second node declines coordinated transmission. For example, if the index of the default CoMP hypothesis is "0000," the default CoMP hypothesis is divided into the following sub-CoMP hypotheses: a sub-CoMP hypothesis for indicating a current overload status, indexed by "000000"; a sub-CoMP hypothesis for indicating that the current buffer area is empty, indexed by "000001"; a sub-CoMP hypothesis for indicating that currently there is no sufficient resource available for coordinated transmission, indexed by "000010"; a sub-CoMP hypothesis for indicating that other CoMP event is currently being processed, indexed by "000011," etc.

It should be noted that the CoMP hypothesis selected by the second node for indicating that the second node currently declines to perform coordinated transmission only indicates that the second node currently declines to perform coordinated transmission under the at least one CoMP hypothesis indicated by the first node, not indicating that the second node does not accept performing coordinated transmission under the at least one CoMP in the future, nor does it indicate that the second node declines to perform coordinated transmission under other CoMP hypothesis than the at least one CoMP hypothesis. It is likely that the first node might re-transmit a new resource allocation request to further request for coordinated transmission with the second node after the second node declines the coordinated transmission this time.

2) when the second node determines it can unconditionally support CoMP only based on its status information and the at least one CoMP hypothesis provided by the first node includes a CoMP hypothesis for indicating unconditional support for the CoMP, the second node directly select the CoMP hypothesis for indicating unconditional support for the CoMP.

For example, the plurality of indexes provided by the first node include "0001," the CoMP hypothesis identified by which is for indicating unconditional support for CoMP. Moreover, the second node determines, only based on its status information, that the number of current active users at the second node is extremely small and there is extremely few data transmissions; then the second node may directly select the index "0001"

3) when the second node cannot determine, only based on its status information, whether it can unconditionally support CoMP, the second node makes judgment with further reference to resource information. Specifically, for each CoMP hypothesis having corresponding resource information in the at least one CoMP hypothesis provided by the first node, the second node determines performance gains that can be generated by coordinated transmission performed under this CoMP hypothesis; moreover, the second node compares all of the determined performance gains with a gain threshold, respectively, to select the CoMP hypothesis. Moreover, based on the comparison result, this scenario may further include:

a) when all of the performance gains determined by the second node are lower than the gain threshold, the second node selects a CoMP hypothesis for indicating that the second node currently declines to perform coordinated transmission.

Herein, the performance gain includes any performance gain related to coordinated transmission of the second node. Preferably, the performance gain includes, but not limited to, gain brought by coordinated transmission to the second node, gain brought by coordinated transmission to the CoMP cluster, average gain brought by coordinated transmission to other nodes within the CoMP cluster, and potential gain brought by coordinated transmission, etc.

Specifically, the second node may compare all of the determined performance gains with the gain threshold in a variety of manners, respectively.

For example, the gain threshold is a predefined value in the second node, the second node comparing all of the determined performance gains with the predefined value.

For another example, the gain threshold is an average gain generated by each CoMP hypothesis with respect to the CoMP cluster and provided in the resource allocation request; then for each CoMP hypothesis having corresponding resource information in the at least one CoMP hypothesis, the second node compares the determined performance gain for this CoMP hypothesis with the average gain for this CoMP hypothesis in the resource allocation request.

b) when the second node determines existence of a performance gain higher than the gain threshold, the second node selects a CoMP hypothesis that can bring a higher performance from among CoMP hypotheses having corresponding resource information, wherein based on the comparison result, the second node may select a CoMP hypothesis for indicating unconditional support for CoMP or select a CoMP hypothesis having dimensional condition(s). Herein, unconditional support for CoMP and supporting for CoMP under certain dimensional condition(s) may be uniformly called capable of supporting CoMP.

For example, when the second node is uncertain about whether it can unconditionally support CoMP only based on its status information, for each CoMP hypothesis having corresponding resource information in the at least one CoMP hypothesis, the second node determines the performance gain that can be generated from performing coordinated transmission under this CoMP hypothesis; next, the second node compares all of the determined performance gains with the gain threshold predefined in the second node, respectively, and selects a CoMP hypothesis corresponding to a performance gain highest above the gain threshold.

It should be noted that during an operation of selecting a CoMP hypothesis at the second node, while the CoMP hypothesis bringing a higher gain performance to the CoMP cluster or other nodes in the CoMP cluster causes the deterioration of performance of the second node, if the performance deterioration exceeds the allowed deterioration scope of the second node, then the second node will not permit a coordinated transmission in the CoMP hypothesis.

It should be noted that the above example is only for better illustrating the technical solution of the present invention, not intended to limit the present invention. Those skilled in the art should understand that any implementation manner of selecting a CoMP hypothesis based on the resource information and/or status information of the second node should be included within the scope of the present invention.

In step S5, the second node sends feedback information with respect to the resource allocation request to the first node.

Herein, the feedback information is for indicating the CoMP hypothesis selected by the second node.

Preferably, when the CoMP hypothesis in the feedback information indicates that the second node currently declines to perform coordinated transmission under the at least one CoMP hypothesis provided at the first node, then the second node further stops the coordinated transmission with the first node.

In step S6, the first node receives feedback information from the second node with respect to the resource allocation request and performs corresponding operations.

Specifically, the implementation manner in which the first node receives feedback information from the second node with respect to the resource allocation request and performs corresponding operations includes, but not limited to:

1) when the CoMP hypothesis in the feedback information from the second node with respect to the resource allocation request indicates that the second node currently declines to perform coordinated transmission under at least one CoMP hypothesis provided at the first node, the first node stops coordinated transmission with the second node.

For example, when the feedback information received by the first node indicates that the index of the CoMP hypothesis selected by the second node is "0000," the CoMP hypothesis corresponding to the index "0000" is for indicating that the second node currently declines to perform coordinated transmission, then the first node stops current coordinated transmission with the second node.

It should be noted that even the feedback information indicates that the second node currently declines to perform coordinated transmission under at least one CoMP hypothesis indicated by the first node, the first node may send, to the second node, other CoMP hypothesis than the at least one CoMP hypothesis thereafter so as to be available for the second node to select, or re-select at least one CoMP hypothesis to be available for the second node to select later when it is needed again to perform coordinated transmission with the second node.

2) when the CoMP hypothesis in the feedback information from the second node with respect to the resource allocation request indicates that the second node currently can support CoMP, the first node actuates the coordinated transmission with the second node based on the CoMP hypothesis. Preferably, when the CoMP hypothesis selected by the second node has a limitation of the dimension condition, the first node actuates the coordinated transmission with the second node on the dimensional condition.

For example, when the feedback information received by the first node indicates that the index of the CoMP hypothesis selected by the second node is "0011," the CoMP hypothesis corresponding to this index is for indicating that the second node permits performing coordinated transmission within a part of sub-band groups at the frequency dimension; then, based on resource information corresponding to the CoMP hypothesis indexed by "0011" in the resource allocation request transmitted by the first node to the second node, the first node actuates the coordinated transmission with the second node within the part of sub-band groups indicated in the resource information.

It should be noted that when the CoMP hypothesis in the feedback information from the second node with respect to the resource allocation request indicates that the second node currently can support CoMP, the first node may store the CoMP hypothesis so as to directly indicate the second node to perform coordinated transmission under this CoMP hypothesis when performing coordinated transmission again, or may use the CoMP hypothesis again as a CoMP hypothesis selected in step S1.

It should be noted that the above example is only for better illustrating the technical solution of the present invention, not intended to limit the present invention. Those skilled in the art should understand that any implementation manner of receiving the feedback information from the second node with respect to the resource allocation request and performing corresponding operations should be included within the scope of the present invention.

According to the embodiments of the present embodiment, all or a part of a plurality of preset CoMP hypotheses define the dimension condition(s) when the second node supports CoMP, such that the first node may select one or more CoMP hypotheses more suitable for the second node from among the plurality of CoMP hypotheses based on the measurement signals reported by the second node, and it makes the resource allocation more reasonable through performing resource allocation to the one or more CoMP hypotheses; moreover, the second node may, based on its status information and influences of different CoMP hypotheses on the performance of the second node, select a CoMP hypothesis, from among the one or more CoMP hypotheses, most suitable for the second node to perform coordinated transmission, thereby enhancing the performance of CoMP transmission.

Besides, the first node may further determine the current status of the second node based on the feedback information from the second node; moreover, when the feedback information from the second node indicates that the second node currently declines to perform coordinated transmission, by dividing the CoMP hypotheses indicating current declination of coordinated transmission according to declination reasons, the first node can further determine the reasons why the second node declines to perform coordinated transmission.

Figure 2:
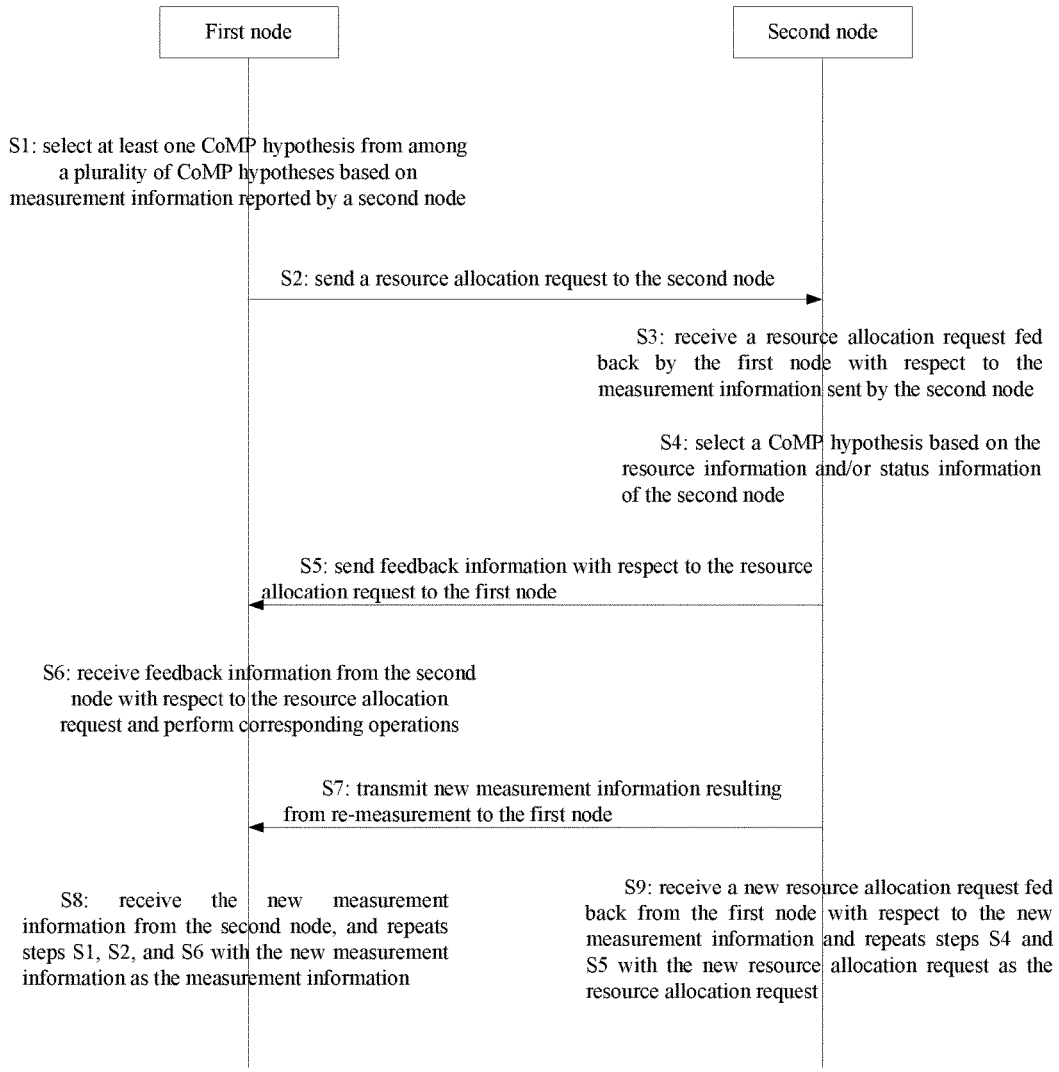
FIG. 2 shows a schematic flow diagram of a method for CoMP-based resource allocation according to another embodiment of the present invention.

FIG. 2 is a flow diagram of a method for performing CoMP-based resource allocation according to another embodiment of the present invention, wherein the method of the present embodiment is mainly implemented through a first node and a second node; wherein any explanation of the first node and the second node with reference to the embodiment in FIG. 1 is incorporated into the present embodiment by reference.

The method according to the present embodiment comprises step S1, step S2, step S3, step S4, step S5, step S6, step S7, step S8, and step S9.

Herein, step S1, step S2, step S3, step S4, step S5, and step S6 have been described in detail in the embodiment with reference to FIG. 1 and are incorporated here by reference; therefore, they will not be detailed.

In step S7, the second node transmits new measurement information resulting from re-measurement to the first node.

Specifically, the second node may transmit new measurement information resulting from re-measurement to the first node in a plurality of manners.

For example, the second node may periodically transmit new measurement information resulting from re-measurement to the first node.

For another example, the second node may perform re-measurement according to a request from the first node and transmit new measurement information resulting from the re-measurement to the first node.

For a further example, when an event occurring in the second node needs the second node to voluntarily report the current measurement information, the second node will transmit the new measurement information resulting from the re-measurement to the first node.

It should be noted that the above example is only for better illustrating the technical solution of the present invention, rather than limiting the present invention. Those skilled in the art should understand that any implementation manner of transmitting new measurement information resulting from re-measurement to the first node should be included within the scope of the present invention.

In step S8, the first node receives the new measurement information from the second node, and repeats steps S1, S2, and S6 with the new measurement information as the measurement information.

Specifically, the first node receives the new measurement information from the second node, and repeats steps S1, S2 and S6 with the new measurement information as measurement information, such that the second node re-selects a CoMP hypothesis.

In step S9, the second node receives a new resource allocation request fed back from the first node with respect to the new measurement information and repeats steps S4 and S5 with the new resource allocation request as the resource allocation request.

Specifically, the second node receives a new resource allocation request fed back from the first node with respect to the new measurement information and repeats steps S4 and S5 with the new resource allocation request as the resource allocation request, so as to feed back its re-selected CoMP hypothesis to the first node, such that the first node updates the CoMP hypothesis for the second node.

According to the solution of the present embodiment, when the second node reports the new measurement information to the first node, the first node may re-select one or more CoMP hypotheses to be available for the second node to select, so as to update the CoMP hypothesis of the second node for performing coordinates transmission, thereby avoiding deterioration of the CoMP transmission performance caused by change of the status of the second node.

Figure 3:
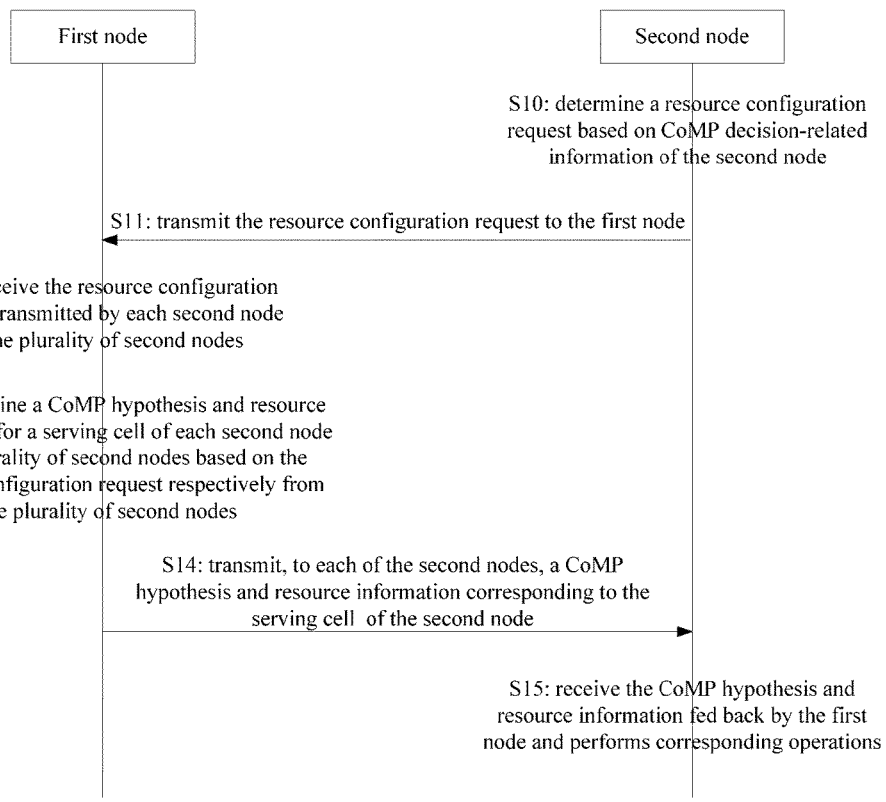
FIG. 3 shows a schematic flow diagram of a method for CoMP-based resource allocation according to a further embodiment of the present invention.

FIG. 3 shows a schematic flow diagram of a method for CoMP-based resource allocation according to a further embodiment of the present invention. Herein, the method according to the present embodiment is mainly implemented through a first node and a second node, the first node and the second node belonging to the same CoMP cluster; wherein for any description of the first and second nodes in the embodiment with reference to FIG. 1, it is incorporated here in the present embodiment. The method according to the present embodiment comprises step S10, step S11, step S12, step S13, step S14, and step S15.

In step S10, the second node determines a resource configuration request based on CoMP decision-related information of the second node, wherein the resource configuration request is for indicating at least one CoMP hypothesis, which is preferable for the second node, of the serving cell of the second node and corresponding resource information, and/or at least one CoMP hypothesis of neighboring cell(s) of the serving cell and corresponding resource information, wherein all or a part of CoMP hypotheses in the at least one CoMP hypothesis define the dimensional condition(s) when the second node supports CoMP.

Specifically, the second node determines, based on CoMP-decision related information, at least one CoMP hypothesis of the serving cell of the second node and corresponding resource information, the at least one CoMP hypothesis being capable of enabling the second node to obtain a better performance, and/or at least one CoMP hypothesis of neighboring cell(s) of the serving cell and corresponding resource information, so as to generate the resource configuration request; in other words, the at least one CoMP hypothesis of the serving cell and its corresponding resource information and/or the at least one CoMP hypothesis of neighboring cell(s) of the serving cell and its corresponding resource information are desired by the second node. Herein, the second node may predict which CoMP hypotheses and resource information can enable itself to obtain a better performance based on CoMP decision-related information.

Herein, the CoMP hypothesis and the dimensional condition have been detailed in the embodiment with reference to FIG. 1, which will not be detailed here.

In the present embodiment, when the dimensional condition of one CoMP hypothesis preferable includes the second node supporting CoMP in partial scope(s) of designated dimension(s), the resource information corresponding to the CoMP hypothesis includes the resource number and/or the resource number ratio of the supported or muted resources under the CoMP hypothesis.

For example, the dimension condition of a CoMP hypothesis preferably includes the second node supporting CoMP in a part of sub-bands at the frequency dimension. The resource information corresponding to this CoMP hypothesis may include the number of supported or muted sub-band groups, and/or the ratio of the supported or muted sub-band groups to all sub-band groups. For example, the resource information includes the number of muted sub-band groups being 3 (corresponding to not supporting CoMP on 3 sub-band groups, i.e., supporting CoMP on other sub-band groups); for another example, the resource information includes the ratio of the muted sub-band groups being 3/9 (corresponding to not supporting CoMP on the 3/9 sub-band group ratio).

As a preferred solution, the resource configuration request may comprise at least one of the following items:
 1) identification information of the first node;
 2) identification information of the serving cell of the second node;
 3) index information for each CoMP hypothesis desired by the second node in the at least one CoMP hypotheses of the serving cell of the second node, and resource information corresponding to each CoMP hypothesis in the at least one CoMP hypothesis determined by the second node, respectively;
 4) identification information of each neighboring cell in at least one neighboring cell of the serving cell;
 5) indexing information of each CoMP hypothesis, desired by the second node, of each neighboring cell in at least one neighboring cell of the serving cell, and resource information corresponding to each CoMP hypothesis, respectively.

Herein, the CoMP decision-related information includes any information that likely affects the CoMP decision of the second node. Preferably, the CoMP decision-related information may include at least any one of the following:
 1) measurement information of the second node. The measurement information has been described in detail with reference to the embodiment with reference to FIG. 1, which will not be detailed here;
 2) buffer information of the buffer area, in the second node, corresponding to a user served by the serving cell of the second node, wherein each user served by the serving cell may have a corresponding buffer area;
 3) fair scheduling metric for the user served by the serving cell of the second node.

It should be noted that the above example is only for better illustrating the technical solution of the present invention, not intended to limit the present invention. Those skilled in the art should understand that any implementation manner of determining a resource configuration request based on the CoMP decision related information should be included within the scope of the present invention.

In step S11, the second node transmits the resource configuration request to the first node.

The first node may have a plurality of second nodes corresponding thereto; then in step S12, the first node receives the resource configuration request transmitted by each second node in the plurality of second nodes.

In step S13, the first node determines a CoMP hypothesis and resource information for the serving cell of each second node in the plurality of second nodes based on the resource configuration request respectively from the plurality of second nodes.

Specifically, for each second node, the first node will provide a CoMP hypothesis and resource information for it. The CoMP hypothesis and resource information might not be any one of the CoMP hypotheses and resource information provided by the second node, i.e., they might be re-determined for the second node by the first node synthesizing the resource configuration requests from the plurality of second nodes.

In step S14, the first node transmits, to each of the second nodes, a CoMP hypothesis and resource information corresponding to the serving cell of the second node.

It should be noted that step S13 and step S14 have no absolute order. For example, the first node may immediately send the CoMP hypothesis and resource information determined for a second node to this second node, and the first node continues to determine the CoMP hypothesis and resource information for another second node.

In step S15, the second node receives the CoMP hypothesis and resource information fed back by the first node and performs corresponding operations.

Specifically, the second node, after receiving the CoMP hypothesis and resource information determined by the first node for it, performs corresponding operations based on the CoMP hypothesis and resource information, e.g., performing a coordinated transmission on an appropriate dimensional condition.

In this embodiment, the second nodes may provide, to the first node, the CoMP hypotheses and resource information, desired by the second node, of neighboring cell(s), while the first node may synthesize the CoMP hypotheses and resource information provided by a plurality of second nodes, to determine the CoMP hypotheses and resource information for respective second nodes, respectively, such that the entire communication system can achieve a better resource schedule.

Figure 4:
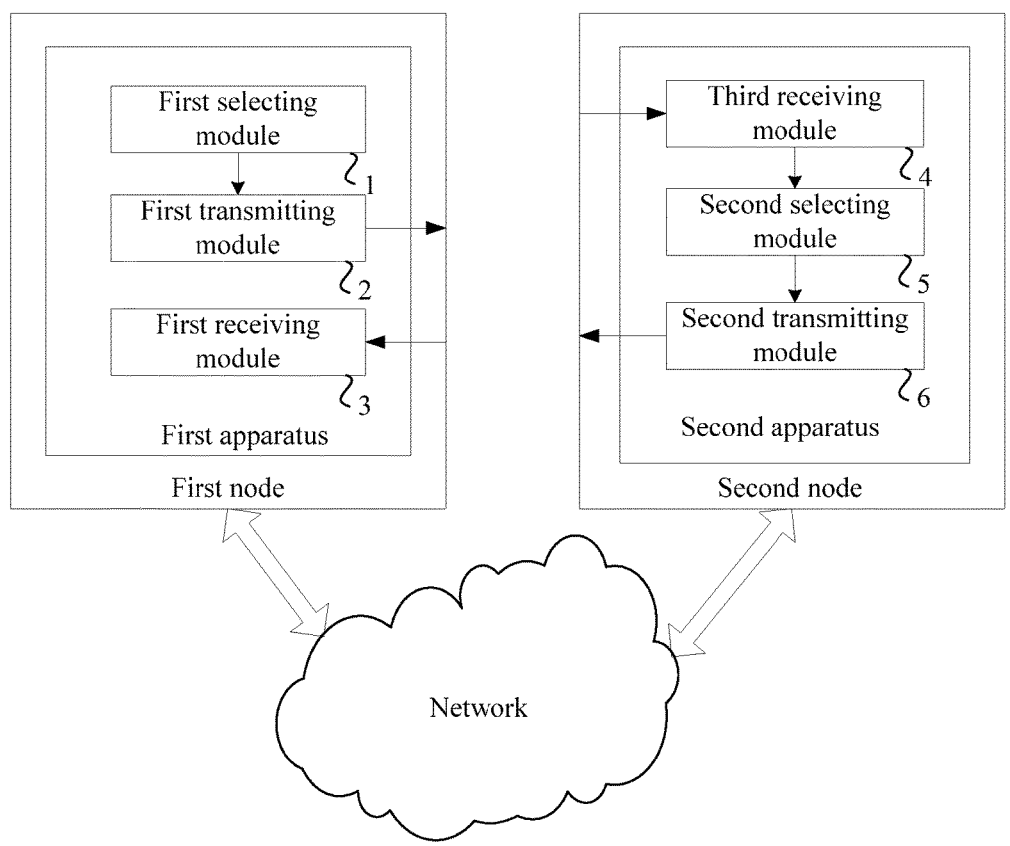
FIG. 4 shows a structural diagram of a system for CoMP-based resource allocation according to one embodiment of the present invention.

FIG. 4 shows a structural diagram of a system for CoMP-based resource allocation according to one embodiment of the present invention. The system according to the present embodiment comprises a first node and a second node; the first node comprises a first apparatus, the first apparatus comprising a first selecting module 1, a first transmitting module 2, and a first receiving module 3; the second node comprises a second apparatus, the second apparatus comprising a third receiving module 4, a second selecting module 5, and a second transmitting module 6.

The first selecting module 1 selects at least one CoMP hypothesis from among a plurality of CoMP hypotheses based on measurement information reported by a second node within a same CoMP cluster.

Herein, the measurement information includes any measurement information reported by the second node and associated with communication quality of the second node; for example, CSI (channel state information) measurement information reported by the second node, RSRP (reference signal receiving power) measurement information, BM (benefit metric) measurement information, etc.

Herein, the plurality of CoMP hypotheses are predetermined a plurality of hypotheses for configuring CoMP transmission. Preferably, all or a part of CoMP hypotheses in the plurality of CoMP hypotheses define dimensional condition(s) when the second node supports CoMP.

Preferably, when a part of CoMP hypotheses in the plurality of CoMP hypotheses define dimensional condition(s) when the second node supports CoMP, the other part of CoMP hypotheses in the plurality of CoMP hypotheses may include CoMP hypotheses indicating that coordinated transmission is not performed currently. For example, index "0000" is used to identify a CoMP hypothesis indicating that coordinated transmission is not performed currently.

More preferably, when a part of CoMP hypotheses in the plurality of CoMP hypotheses define the dimensional condition(s) when the second node supports CoMP, the other part of CoMP hypotheses in the plurality of CoMP hypotheses may also include CoMP hypotheses indicating that coordinated transmission is irrelevant to dimensional condition(s). For example, index "0001" may be used to identify such CoMP hypothesis: the second node supports CoMP unconditionally, i.e., the second node's support to coordinated transmission is irrelevant to dimensional condition(s).

Herein, the dimensional condition(s) when the second node supports CoMP include any limitation of the dimension when the second node supporting CoMP; preferably, the dimensional condition(s) when the second node supports CoMP include at least one of the following:

1) the second node supports CoMP on designated dimension(s).

Herein, the designated dimension includes any dimension that might influence the CoMP transmission performance, e.g., spatial dimension, temporal dimension, frequency dimension, power dimension, etc. More specifically, the dimension may be represented as beam group, period of time, sub-band group, power level, etc.

Preferably, the second node may support CoMP on two or more designated dimensions. For example, the second node supports CoMP on temporal dimension, frequency dimension and power dimension.

2) the second node supports CoMP with partial scope(s) of designated dimensions.

Herein, the partial scope indicates a partial scope in the entire designated dimension. For example, for the spatial dimension, it may be represented as a part of beam groups among all beam groups; for the time dimension, it may be represented as a part of period of time within the entire period of time; for the frequency dimension, it may be represented as a part of sub-band group within the entire sub-band group; and for the power dimension, it may be represented as a part of particular power level among all power levels, etc.

Preferably, the second node may support CoMP within partial scopes of two or more designated dimensions.

For example, the second node supports CoMP within a part of beam groups of the spatial dimension and a part of period of time of the time dimension.

It should be noted that the above dimension conditions 1) and 2) may exist simultaneously. In other words, the second node may support CoMP within the entire scopes of some designated dimensions and support CoMP within partial scope(s) of some other designated dimensions. For example, it supports CoMP in the entire period of time, and supports CoMP in a part of sub-band groups.

Herein, possible situations like occurring when the first selecting module 1 selects CoMP hypotheses include, but limited to:

1) the first selecting module 1 determines that the second node is currently not suitable for coordinated transmission based on the measurement information reported by the second node; then, the first selecting module 1 selects a CoMP hypothesis, from among a plurality of CoMP hypotheses, which is used for indicating that coordinated transmission is not performed currently.

For example, the first selecting module 1 determines that the current channel state of the second node is not suitable for performing coordinated transmission based on the channel status information reported by the second node; then the first selecting module 1 selects the index "0000" from among a plurality of CoMP hypotheses, the CoMP hypothesis identified by the index "0000" being for indicating that coordinated transmission is not performed currently.

2) the first selecting module 1 determines that the second node is currently suitable for coordinated transmission based on the measurement information reported by the second node. This situation further includes the following possibilities:

a) the first selecting module 1 determines that the second node may support coordinated transmission unconditionally based on the measurement information reported by the second node; then the first selecting module 1 selects a CoMP hypothesis for indicating unconditional support for the CoMP from a plurality of CoMP hypotheses.

For example, the first selecting module 1 determines that the current load of the second node is very light and the channel condition is very good based on the measurement information reported by the second node, then the first selecting module 1 selects the index "0001" from among a plurality of CoMP hypotheses, the CoMP hypothesis identified by the index "0001" is for indicating unconditional support for the coordinated transmission.

b) preferably, the first selecting module 1 comprises a first sub-selecting module (not shown). The first sub-selecting module determines that the performance may be relatively good in a part of dimensions and/or partial scope(s) of dimension(s) when performing coordinated transmission with the second node, based on the measurement information reported by the second node; then the first node selects at least one CoMP hypothesis corresponding to the determined part of dimensions and/or partial scope(s) of the dimension from among the plurality of CoMP hypotheses.

For example, the first sub-selecting module determines based on the measurement information reported by the second node that the dimension with a better performance when performing coordinated transmission with the second node is the temporal dimension; then the first sub-selecting module selects a CoMP hypothesis for indicating support for CoMP on the temporal dimension from among the plurality of CoMP hypotheses.

For another example, the first sub-selecting module determines, based on the measurement information reported by the second node, that the performance is better when performing coordinated transmission with the second node under the condition of a part of period of time, a part of sub-band groups, and a combination of a part of period of time and a part of sub-band groups; then the first sub-selecting module selects indexes "0010," "0011" and "0110" from among a plurality of CoMP hypotheses; wherein the CoMP hypothesis identified by index "0010" is for indicating that the second node supports CoMP within a part of period of time at the temporal dimension, the CoMP hypothesis identified by the index "0011" is for indicating that the second node supports CoMP within a part of sub-band groups at the frequency dimension, and the CoMP hypothesis identified by the index "0110" is for indicating that the second node supports CoMP within a part of period of time at the temporal dimension and a part of sub-band groups at the frequency dimension.

It should be noted that the designated dimensions in the CoMP hypotheses should be corresponding to a part of dimensions under this situation. For example, if it is determined that the performance on spatial dimension is relatively good, then the dimensional condition defined by the CoMP hypothesis is supporting CoMP on the beam group; however, partial scope(s) of designated dimension(s) in the CoMP hypothesis only indicates that the CoMP is supported not in the entire scope of the dimension, but only partial scope(s) therein; in fact, in a CoMP hypothesis, it might not specifically define which partial scope specifically refers to. However, in this situation, the partial scope determined by the first node may be a specific numerical value, e.g., a specific time period, etc.

Preferably, the above implementation manner a) and implementation manner b) may be combined. For example if the first selecting module 1 determines, based on the measurement information reported by the second node, that the second node likely supports CoMP unconditionally, and the second node also has a possibility of supporting CoMP better in a part of dimensions or partial scope(s) of dimension(s), the first selecting module 1 may select a CoMP hypothesis for indicating unconditional support for the CoMP from among a plurality of CoMP hypotheses and one or more CoMP hypotheses defining the dimensional condition(s) when the second node supports CoMP.

Preferably, for the above scenario 2), although the first selecting module 1 determines that the second node is currently suitable for coordinated transmission based on the measurement information reported by the second node, the first selecting module 1 may also select a CoMP hypothesis (e.g., selecting the index "0000") for indicating that coordinated transmission is not performed currently while selecting one or more CoMP hypotheses suitable for coordinated transmission from among a plurality of CoMP hypotheses, such that when the second node determines that it currently does not perform coordinated transmission based on its own information, it may select a CoMP hypothesis for indicating that coordinated transmission is not performed currently so as to feed back to the first node. More preferably, the first selecting module 1 may decide, based on whether the second node is configured in default with a CoMP hypothesis indicating that coordinated transmission is not performed currently, whether the CoMP hypothesis indicating that coordinated transmission is not performed currently should be selected and provided to the second node. For example, if the second node currently already has a default index "0000" (the first node may determine whether the second node has the default index based on the default configuration of the entire communication system), then the first selecting module 1 might not select the default index "0000"; if the second node currently does not have a default index "0000," then the first selecting module 1 also selects the default index and provides it to the second node while selecting other index.

It should be noted that the above example is only for better illustrating the technical solution of the present invention, not intended to limit the present invention. Those skilled in the art should understand that any implementation manner of selecting at least one CoMP hypothesis from among a plurality of CoMP hypotheses based on the measurement information reported by the second node in the same CoMP cluster should be included within the scope of the present invention.

The first transmitting module 2 sends a resource allocation request to the second node.

Herein, the resource allocation request is used for requesting allocation of resources to the second node, wherein the resource allocation request is for indicating the at least one CoMP hypothesis available for the second node to select and resource information corresponding to all or a part of CoMP hypotheses in the at least one CoMP hypothesis, respectively.

As a preferred solution, in the present embodiment, the resource allocation request may include, but not limited to:
1) identification information of the first node.
2) identification information of the second node or receiving cell (target cell).
3) index information of at least one CoMP hypothesis available for the second node to select.
4) resource information corresponding to all or a part of CoMP hypotheses among the at least one CoMP hypothesis available for the second node to select.

Herein, the resource information includes any information related to resource allocation for coordinated transmission. Preferably, the resource information includes resource block information. More preferably, for a CoMP hypothesis available for the second node to select, if it has a dimensional condition and the dimensional condition includes that the second node supports CoMP within partial scope(s) of designated dimension(s), then resource information may also include a specific indication of the partial scope(s). More preferably, the specific indication may limit the specific range value. For example, the CoMP hypothesis corresponding to the index "0010" selected by the first node limits that the second node supports CoMP within a part of period of time at the temporal dimension, then the resource information includes a specific time scope of the part of period of time limited by the CoMP hypothesis; moreover, the specific indication may limit the specific number of resources and/or resource number ratio. For example, the CoMP hypothesis corresponding to the index "0011" selected by the first node limits that the second node supports CoMP within a part of sub-bands at the frequency dimension, then the specific indication of the part of sub-band group included in the resource information may be: the number of supported or muted sub-band groups, e.g., muting 3 sub-band groups, or the radio of the supported or muted sub-band groups to all sub-band groups, e.g., 3/9, etc.

5) Average gains generated, for the CoMP cluster, by all or a part of CoMP hypotheses in the at least one CoMP hypothesis available for the second node to select, respectively.

The third receiving module 4 of the second node receives a resource allocation request fed back by the first node with respect to the measurement information sent by the second node.

The second selecting module 5 of the second node selects a CoMP hypothesis based on the resource information and/or status information of the second node.

Herein, the status information includes any information for indicating a current status of the second node. Preferably, the status information includes, but not limited to:
1) load condition of the second node;
2) buffer area status of a second node buffer area;
3) active user amount of the second node;
4) CoMP processing status of the second node.

Specifically, the scenario likely occurring when the second selecting module 5 selects a CoMP hypothesis based on the resource information and/or status information of the second node includes, but not limited to:
1) the second selecting module 5 comprises a third sub-selecting module (not shown). If the third sub-selecting module determines that it is currently not suitable for coordinated transmission only based on its status information, then the third sub-selecting module selects a CoMP hypothesis for indicating that the second node currently declines to perform coordinated transmission.

For example, when the third sub-selecting module determines, bases on its status information, if it is currently in an overload status and no resource is available for coordinated transmission, the third sub-selecting module selects the index "0000" for the CoMP hypothesis indicating that the second node currently declines coordinated transmission.

For another example, if the third sub-selecting module determines, based on its status information, that it is currently processing other resource allocation request, the third sub-selecting module selects the index "0000" for the CoMP hypothesis indicating that the second node currently declines coordinated transmission.

It should be noted that if the second node sets in default a CoMP hypothesis (hereinafter referred to as the default CoMP hypothesis) indicating that the second node currently declines coordinated transmission, then even the optional CoMP hypothesis provided by the first node does not include the default CoMP hypothesis, the second selecting module 5 of the second node can still directly select the default CoMP hypothesis in the case of determining that the CoMP is currently not supported. In other words, the CoMP hypothesis selected by the second selecting module 5 may come from the at least one CoMP hypothesis provided by the first node or from the default CoMP hypothesis; if the second node does not have the default CoMP hypothesis, then the CoMP hypotheses selected by the second selecting module 5 all come from the at least one CoMP hypothesis provided by the first node (in this case, the first node will generally provide the default CoMP hypothesis).

Preferably, the default CoMP hypothesis may be divided into a plurality of sub-CoMP hypotheses according to the reasons why the second node declines coordinated transmission. For example, if the index of the default CoMP hypothesis is "0000," the default CoMP hypothesis is divided into the following sub-CoMP hypotheses: a sub-CoMP hypothesis for indicating a current overload status, indexed by "000000"; a sub-CoMP hypothesis for indicating that the current buffer area is empty, indexed by "000001"; a sub-CoMP hypothesis for indicating that currently there is no sufficient resource available for coordinated transmission, indexed by "000010"; a sub-CoMP hypothesis for indicating that other CoMP event is currently being processed, indexed by "000011," etc.

It should be noted that the CoMP hypothesis selected by the third sub-selecting module for indicating that the second node currently declines to perform coordinated transmission only indicates that the second node currently declines to perform coordinated transmission under the at least one CoMP hypothesis indicated by the first node, not indicating that the second node does not accept performing coordinated transmission under the at least one CoMP in the future, nor does it indicate that the second node declines to perform coordinated transmission under other CoMP hypothesis than the at least one CoMP hypothesis. It is likely that the first node might re-transmit a new resource allocation request to further request for coordinated transmission with the second node after the second node declines the coordinated transmission this time.

2) when the second selecting module 5 determines it can unconditionally support CoMP only based on its status information and the at least one CoMP hypothesis provided by the first node includes a CoMP hypothesis for indicating unconditional support for the CoMP, the second selecting module 5 directly select the CoMP hypothesis for indicating unconditional support for the CoMP.

For example, the plurality of indexes provided by the first node include "0001," the CoMP hypothesis identified by which is for indicating unconditional support for CoMP. Moreover, the second selecting module 5 determines, only based on its status information, that the number of current active users at the second node is extremely small and there is extremely few data transmissions; then the second selecting module 5 may directly select the index "0001."

3) when the second selecting module 5 cannot determine, only based on its status information, whether it can unconditionally support CoMP, the second selecting module 5 makes judgment with further reference to resource information. The second selecting module 5 further comprises a first determining module (not shown) and a second sub-selecting module (not shown). Specifically, for each CoMP hypothesis having corresponding resource information in the at least one CoMP hypothesis provided by the first node, the first determining module determines performance gains that can be generated by coordinated transmission performed under this CoMP hypothesis; moreover, the second sub-selecting module compares all of the determined performance gains with a gain threshold, respectively, to select the CoMP hypothesis. Moreover, based on the comparison result, this scenario may further include:

a) when the second sub-selecting module determines that all of the performance gains determined by the first determining module are lower than the gain threshold, the second sub-selecting module selects a CoMP hypothesis for indicating that the second node currently declines to perform coordinated transmission.

Herein, the performance gain includes any performance gain related to coordinated transmission of the second node. Preferably, the performance gain includes, but not limited to, gain brought by coordinated transmission to the second node, gain brought by coordinated transmission to the CoMP cluster, average gain brought by coordinated transmission to other nodes within the CoMP cluster, and potential gain brought by coordinated transmission, etc.

Specifically, the second sub-selecting module may compare all of the determined performance gains with the gain threshold in a variety of manners, respectively.

For example, the gain threshold is a predefined value in the second node, the second sub-selecting module comparing all of the determined performance gains with the predefined value.

For another example, the gain threshold is an average gain generated by each CoMP hypothesis with respect to the CoMP cluster and provided in the resource allocation request; then for each CoMP hypothesis having corresponding resource information in the at least one CoMP hypothesis, the second sub-selecting module compares the determined performance gain for this CoMP hypothesis with the average gain for this CoMP hypothesis in the resource allocation request.

b) when the second sub-selecting module determines existence of a performance gain higher than the gain threshold, the second sub-selecting module selects a CoMP hypothesis that can bring a higher performance from among CoMP hypotheses having corresponding resource information, wherein based on the comparison result, the second sub-selecting module may select a CoMP hypothesis for indicating unconditional support for CoMP or select a CoMP hypothesis having dimensional condition(s). Herein, unconditional support for CoMP and supporting for CoMP under certain dimensional condition(s) may be uniformly called capable of supporting CoMP.

For example, when the second selecting module 5 is uncertain about whether it can unconditionally support CoMP only based on its status information, for each CoMP hypothesis having corresponding resource information in the at least one CoMP hypothesis, the first determining module determines the performance gain that can be generated from performing coordinated transmission under this CoMP hypothesis; next, the second sub-selecting module compares all of the determined performance gains with the gain threshold predefined in the second node, respectively, and selects a CoMP hypothesis corresponding to a performance gain highest above the gain threshold.

It should be noted that during an operation of the second sub-selecting module selecting a CoMP hypothesis, while the CoMP hypothesis bringing a higher gain performance to the CoMP cluster or other nodes in the CoMP cluster causes the deterioration of performance of the second node, if the performance deterioration exceeds the allowed deterioration scope of the second node, then the second sub-selecting module will not permit a coordinated transmission in the CoMP hypothesis.

It should be noted that the above example is only for better illustrating the technical solution of the present invention, not intended to limit the present invention. Those skilled in the art should understand that any implementation manner of selecting a CoMP hypothesis based on the resource information and/or status information of the second node should be included within the scope of the present invention.

The second transmitting module 6 sends feedback information with respect to the resource allocation request to the first node.

Herein, the feedback information is for indicating the CoMP hypothesis selected by the second node.

Preferably, when the CoMP hypothesis in the feedback information indicates that the second node currently declines to perform coordinated transmission under the at least one CoMP hypothesis provided at the first node, then the second transmitting module 6 further stops the coordinated transmission with the first node.

The first receiving module 3 receives feedback information from the second node with respect to the resource allocation request and performs corresponding operations.

Specifically, the implementation manner in which the first receiving module 3 receives feedback information from the second node with respect to the resource allocation request and performs corresponding operations includes, but not limited to:

1) when the CoMP hypothesis in the feedback information from the second node with respect to the resource allocation request indicates that the second node currently declines to perform coordinated transmission under at least one CoMP hypothesis provided at the first node, the first receiving module 3 stops coordinated transmission with the second node.

For example, when the feedback information received by the first receiving module 3 indicates that the index of the CoMP hypothesis selected by the second node is "0000," the CoMP hypothesis corresponding to the index "0000" is for indicating that the second node currently declines to perform coordinated transmission, then the first receiving module 3 stops current coordinated transmission with the second node.

It should be noted that even the feedback information indicates that the second node currently declines to perform coordinated transmission under at least one CoMP hypothesis indicated by the first node, the first node may send, to the second node, other CoMP hypothesis than the at least one CoMP hypothesis thereafter so as to be available for the second node to select, or re-select at least one CoMP hypothesis to be available for the second node to select later when it is needed again to perform coordinated transmission with the second node.

2) when the CoMP hypothesis in the feedback information from the second node with respect to the resource allocation request indicates that the second node currently can support CoMP, the first receiving module 3 actuates the coordinated transmission with the second node based on the CoMP hypothesis. Preferably, when the CoMP hypothesis selected by the second node has a limitation of the dimension condition, the first receiving module 3 actuates the coordinated transmission with the second node on the dimensional condition.

For example, when the feedback information received by the first receiving module 3 indicates that the index of the CoMP hypothesis selected by the second node is "0011," the CoMP hypothesis corresponding to this index is for indicating that the second node permits performing coordinated transmission within a part of sub-band groups at the frequency dimension; then, based on resource information corresponding to the CoMP hypothesis indexed by "0011" in the resource allocation request transmitted by the first node to the second node, the first receiving module 3 actuates the coordinated transmission with the second node within the part of sub-band groups indicated in the resource information.

It should be noted that when the CoMP hypothesis in the feedback information from the second node with respect to the resource allocation request indicates that the second node currently can support CoMP, the first receiving module 3 may store the CoMP hypothesis so as to directly indicate the second node to perform coordinated transmission under this CoMP hypothesis when performing coordinated transmission again, or may use the CoMP hypothesis again as a CoMP hypothesis selected by the first selecting module 1.

It should be noted that the above example is only for better illustrating the technical solution of the present invention, not intended to limit the present invention. Those skilled in the art should understand that any implementation manner of receiving the feedback information from the second node with respect to the resource allocation request and performing corresponding operations should be included within the scope of the present invention.

According to the embodiments of the present embodiment, all or a part of a plurality of preset CoMP hypotheses define the dimension condition(s) when the second node supports CoMP, such that the first node may select one or more CoMP hypotheses more suitable for the second node from among the plurality of CoMP hypotheses based on the measurement signals reported by the second node, and it makes the resource allocation more reasonable through performing resource allocation to the one or more CoMP hypotheses; moreover, the second node may, based on its status information and influences of different CoMP hypotheses on the performance of the second node, select a CoMP hypothesis, from among the one or more CoMP hypotheses, most suitable for the second node to perform coordinated transmission, thereby enhancing the performance of CoMP transmission.

Besides, the first node may further determine the current status of the second node based on the feedback information from the second node; moreover, when the feedback information from the second node indicates that the second node currently declines to perform coordinated transmission, by dividing the CoMP hypotheses indicating current declination of coordinated transmission according to declination reasons, the first node can further determine the reasons why the second node declines to perform coordinated transmission.

Figure 5:
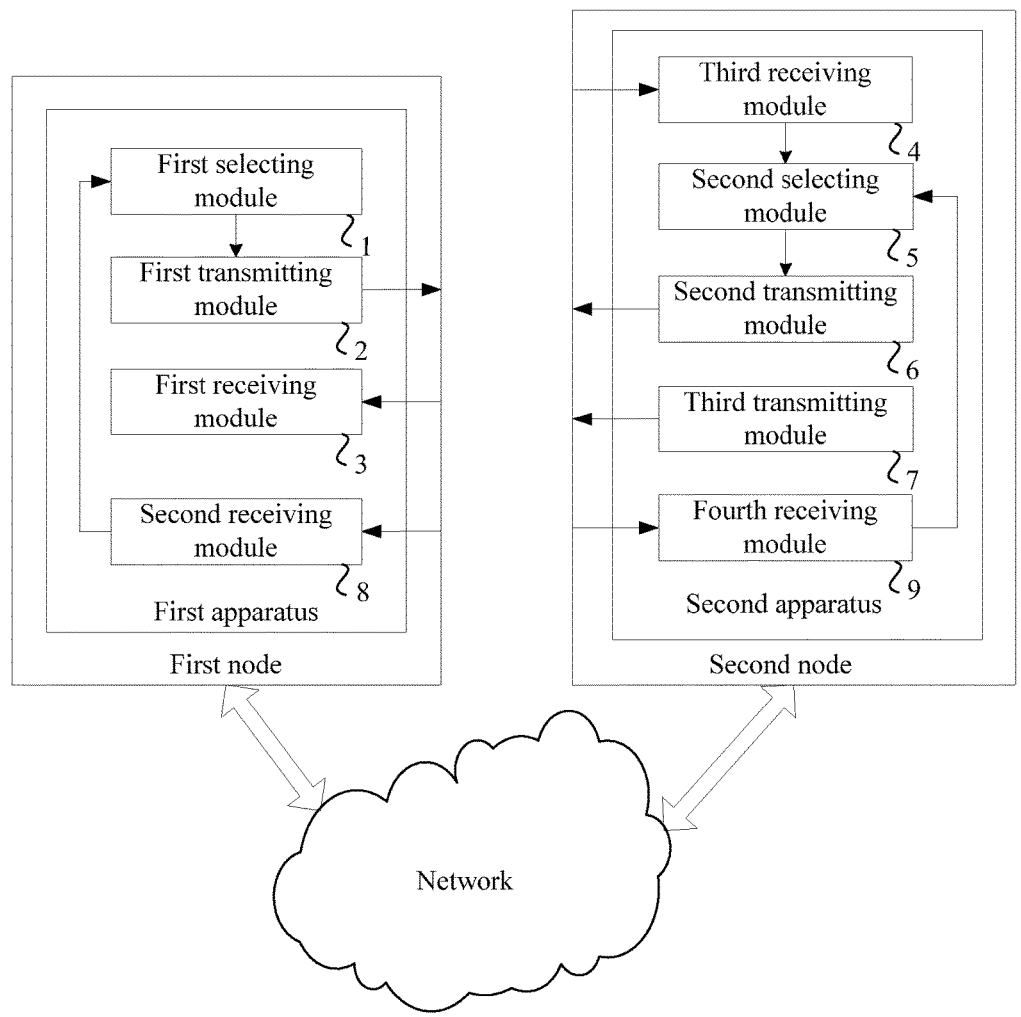
FIG. 5 shows a structural diagram of a system for CoMP-based resource allocation according to another embodiment of the present invention.

FIG. 5 shows a structural diagram of a system for CoMP-based resource allocation according to another embodiment of the present invention. The system according to the present embodiment comprises a first node and a second node; the first node comprises a first apparatus, the first apparatus comprising a first selecting module 1, a first transmitting module 2, a first receiving module 3, and a second receiving module 8; the second node comprises a second apparatus, the second apparatus comprising a third receiving module 4, a second selecting module 5, a second transmitting module 6, a third transmitting module 7, and a fourth receiving module 9.

Herein, the first selecting module 1, the first transmitting module 2, the first receiving module 3, the third receiving module 4, the second selecting module 5, the second transmitting module 6 have been described in detail in the embodiment with reference to FIG. 4 and are incorporated here by reference; therefore, they will not be detailed.

The third transmitting module 7 of the second node transmits new measurement information resulting from re-measurement to the first node.

Specifically, the third transmitting module 7 may transmit new measurement information resulting from re-measurement to the first node in a plurality of manners.

For example, the third transmitting module 7 may periodically transmit new measurement information resulting from re-measurement to the first node.

For another example, the third transmitting module 7 may perform re-measurement according to a request from the first node and transmit new measurement information resulting from the re-measurement to the first node.

For a further example, when an event occurring in the second node needs the second node to voluntarily report the current measurement information, the third transmitting module 7 will transmit the new measurement information resulting from the re-measurement to the first node.

It should be noted that the above example is only for better illustrating the technical solution of the present invention, rather than limiting the present invention. Those skilled in the art should understand that any implementation manner of transmitting new measurement information resulting from re-measurement to the first node should be included within the scope of the present invention.

The second receiving module 8 of the first node receives the new measurement information from the second node, and triggers the first selecting module 1, the first transmitting module 2 and the first receiving module 3 to repetitively perform operations with the new measurement information as the measurement information.

Specifically, the second receiving module 8 receives the new measurement information from the second node, regards the new measurement information as the measurement information, and triggers the first selecting module 1, the first transmitting module 2 and the first receiving module 3 to repetitively perform operations, such that the second node re-selects a CoMP hypothesis.

The fourth receiving module 9 of the second node receives a new resource allocation request fed back from the first node with respect to the new measurement information, and triggers the second selecting module 5 and the second transmitting module 6 to repetitively perform operations with the new resource allocation request as the resource allocation request.

Specifically, the second node receives a new resource allocation request fed back from the first node with respect to the new measurement information, regards the new resource allocation request as the resource allocation request, and triggers the second selecting module 5 and the second transmitting module 6 to repetitively perform operations, so as to feed back its re-selected CoMP hypothesis to the first node, such that the first node updates the CoMP hypothesis for the second node.

According to the solution of the present embodiment, when the second node reports the new measurement information to the first node, the first node may re-select one or more CoMP hypotheses to be available for the second node to select, so as to update the CoMP hypothesis of the second node for performing coordinates transmission, thereby avoiding deterioration of the CoMP transmission performance caused by change of the status of the second node.

Figure 6:
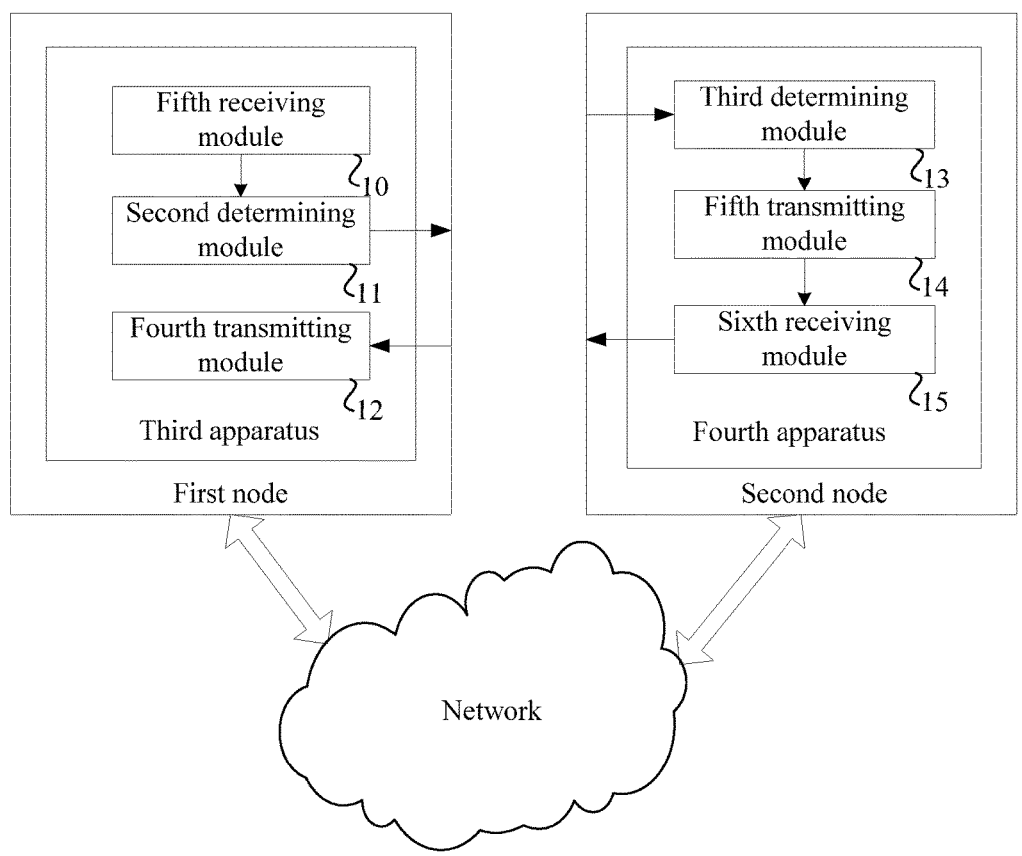
FIG. 6 shows a structural diagram of a system for CoMP-based resource allocation according to a further embodiment of the present invention.

FIG. 6 shows a structural diagram of a system for CoMP-based resource allocation according to a further embodiment of the present invention. The system according to the present embodiment comprises a first node and a second node; the first node comprises a third apparatus, the third apparatus comprising a fifth receiving module 12, a second determining module 13, and a fourth transmitting module 14; the second node comprises a fourth apparatus, the fourth apparatus comprising a third determining module 10, a fifth transmitting module 11, and a sixth receiving module 15.

The third determining module 10 determines a resource configuration request based on CoMP decision-related information of the second node, wherein the resource configuration request is for indicating at least one CoMP hypothesis, which is preferable for the second node, of the serving cell of the second node and corresponding resource information, and/or at least one CoMP hypothesis of neighboring cell(s) of the serving cell and corresponding resource information, wherein all or a part of CoMP hypotheses in the at least one CoMP hypothesis define the dimensional condition(s) when the second node supports CoMP.

Specifically, the third determining module 10 determines, based on CoMP-decision related information, at least one CoMP hypothesis of the serving cell of the second node and corresponding resource information, the at least one CoMP hypothesis being capable of enabling the second node to obtain a better performance, and/or at least one CoMP hypothesis of neighboring cell(s) of the serving cell and corresponding resource information, so as to generate the resource configuration request; in other words, the at least one CoMP hypothesis of the serving cell and its corresponding resource information and/or the at least one CoMP hypothesis of neighboring cell(s) of the serving cell and its corresponding resource information are desired by the second node. Herein, the third determining module 10 may predict which CoMP hypotheses and resource information can enable itself to obtain a better performance based on CoMP decision-related information.

Herein, the CoMP hypothesis and the dimensional condition have been detailed in the embodiment with reference to FIG. 4, which will not be detailed here.

In the present embodiment, when the dimensional condition of one CoMP hypothesis preferable includes the second node supporting CoMP in partial scope(s) of designated dimension(s), the resource information corresponding to the CoMP hypothesis includes the resource number and/or the resource number ratio of the supported or muted resources under the CoMP hypothesis.

For example, the dimension condition of a CoMP hypothesis preferably includes the second node supporting CoMP in a part of sub-bands at the frequency dimension. The resource information corresponding to this CoMP hypothesis may include the number of supported or muted sub-band groups, and/or the ratio of the supported or muted sub-band groups to all sub-band groups. For example, the resource information includes the number of muted sub-band groups being 3 (corresponding to not supporting CoMP on 3 sub-band groups, i.e., supporting CoMP on other sub-band groups); for another example, the resource information includes the ratio of the muted sub-band groups being 3/9 (corresponding to not supporting CoMP on the 3/9 sub-band group ratio).

As a preferred solution, the resource configuration request may comprise at least one of the following items:

1) identification information of the first node;
2) identification information of the serving cell of the second node;
3) index information for each CoMP hypothesis desired by the second node in the at least one CoMP hypotheses of the serving cell of the second node, and resource information corresponding to each CoMP hypothesis in the at least one CoMP hypothesis determined by the second node, respectively;
4) identification information of each neighboring cell in at least one neighboring cell of the serving cell;
5) indexing information of each CoMP hypothesis, desired by the second node, of each neighboring cell in at least one neighboring cell of the serving cell, and resource information corresponding to each CoMP hypothesis, respectively.

Herein, the CoMP decision-related information includes any information that likely affects the CoMP decision of the third determining module 10. Preferably, the CoMP decision-related information may include at least any one of the following:

1) measurement information of the second node. The measurement information has been described in detail with reference to the embodiment with reference to FIG. 1, which will not be detailed here;
2) buffer information of the buffer area, in the second node, corresponding to a user served by the serving cell of the second node, wherein each user served by the serving cell may have a corresponding buffer area;
3) fair scheduling metric for the user served by the serving cell of the second node.

It should be noted that the above example is only for better illustrating the technical solution of the present invention, not intended to limit the present invention. Those skilled in the art should understand that any implementation manner of determining a resource configuration request based on the CoMP decision related information should be included within the scope of the present invention.

The fifth transmitting module 11 transmits the resource configuration request to the first node.

The first node may have a plurality of second nodes corresponding thereto; then the fifth receiving module 12 receives the resource configuration request transmitted by each second node in the plurality of second nodes.

The second determining module 13 determines a CoMP hypothesis and resource information for the serving cell of each second node in the plurality of second nodes based on the resource configuration request respectively from the plurality of second nodes.

Specifically, for each second node, the second determining module 13 will provide a CoMP hypothesis and resource information for it. The CoMP hypothesis and resource information might not be any one of the CoMP hypotheses and resource information provided by the second node, i.e., they might be re-determined for the second node by the second determining module 13 synthesizing the resource configuration requests from the plurality of second nodes.

The fourth transmitting module 14 transmits, to each of the second nodes, a CoMP hypothesis and resource information corresponding to the serving cell of the second node.

It should be noted that the operation of the second determining module 13 and the fourth transmitting module 14 have no absolute order. For example, the fourth transmitting module 14 may immediately send the CoMP hypothesis and resource information to the second node after they are determined by the second determining module 13, and the second determining module 13 continues to determine the CoMP hypothesis and resource information for another second node.

The sixth receiving module 15 receives the CoMP hypothesis and resource information fed back by the first node and performs corresponding operations.

Specifically, the sixth receiving module 15, after receiving the CoMP hypothesis and resource information determined by the first node for the second node, performs corresponding operations based on the CoMP hypothesis and resource information, e.g., performing a coordinated transmission on an appropriate dimensional condition.

In this embodiment, the second nodes may provide, to the first node, the CoMP hypotheses and resource information, desired by the second node, of neighboring cell(s), while the first node may synthesize the CoMP hypotheses and resource information provided by a plurality of second nodes, to determine the CoMP hypotheses and resource information for respective second nodes, respectively, such that the entire communication system can achieve a better resource schedule.

It should be noted that the present invention may be implemented in software and/or a combination of software and hardware. For example, each module of the present invention may be implemented by an application-specific integrated circuit (ASIC) or any other similar hardware device. In one embodiment, the software program of the present invention may be executed through a processor to implement the steps or functions as mentioned above. Likewise, the software program (including relevant data structure) of the present invention may be stored in a computer readable recording medium, e.g., RAM memory, magnetic or optic driver or soft floppy or similar devices. Additionally, some steps or functions of the present invention may be implemented by hardware, for example, a circuit cooperating with the processor so as to implement various steps of functions.

To those skilled in the art, it is apparent that the present invention is not limited to the details of the above exemplary embodiments, and the present invention may be implemented with other embodiments without departing from the spirit or basic features of the present invention. Thus, in any way, the embodiments should be regarded as exemplary, not limitative; the scope of the present invention is limited by the appended claims, instead of the above depiction. Thus, all variations intended to fall into the meaning and scope of equivalent elements of the claims should be covered within the present invention. No reference signs in the claims should be regarded as limiting the involved claims. Besides, it is apparent that the term "comprise" does not exclude other units or steps, and singularity does not exclude plurality. A plurality of units or modules stated in a system claim may also be implemented by a single unit or module through software or hardware. Terms such as the first and the second are used to indicate names, but do not indicate any particular sequence.

What is claimed is:

1. A first apparatus, in a first node, for coordinated multipoint (CoMP)-based resource allocation for a second node, wherein the first node and the second node belong to the same CoMP cluster, the first apparatus comprising:
   at least one processor; and
   at least one memory including computer program code, the at least one memory and the computer program code configured to, with the at least one processor, cause the first apparatus to at least:
   select a plurality of CoMP hypotheses from among a first plurality of CoMP hypotheses based on measurement information reported by the second node, wherein all or a part of CoMP hypotheses in the first plurality of CoMP hypotheses define dimensional condition(s) that identify circumstances under which the second node supports CoMP;
   transmit a resource allocation request to the second node, wherein the resource allocation request is for indicating the selected plurality of CoMP hypotheses from which the second node may make a subsequent selection and resource information corresponding to all or a part of CoMP hypotheses in the selected plurality of CoMP hypotheses, respectively;
   receive feedback information from the second node with a response to the resource allocation request, and perform a corresponding operation, wherein the feedback information indicates a CoMP hypothesis selected by the second node.

2. The first apparatus according to claim 1, wherein the dimensional condition(s) that identify circumstances under which the second node supports CoMP include at least one of the following:
   the second node supporting CoMP at designated dimension(s);
   the second node supporting CoMP with partial scope(s) of the designated dimension.

3. The first apparatus according to claim 2, wherein the dimensional condition(s) include the second node supporting CoMP with partial scope(s) of the designated dimension, and the resource information includes a specific indication of the partial scope.

4. A communication system, comprising a first apparatus according to claim 1, and a second apparatus comprising:
   at least one processor; and
   at least one memory including computer program code, the at least one memory and the computer program code configured to, with the at least one processor, cause the second apparatus to at least:
   receive a resource allocation request, with respect to measurement information transmitted by the second node, fed back by the first node, wherein the resource allocation request is for indicating the plurality of CoMP hypotheses from which the second node may select and resource information corresponding to all or a part of CoMP hypotheses in the plurality of CoMP hypothesis, respectively, and all or the part of CoMP hypotheses in the at least one CoMP hypothesis defining dimensional condition(s) indicating when the second node supports CoMP, a second selecting module configured to select a CoMP hypothesis based on the resource information and/or status information of the second node, and a second transmitting module configured to transmit, to the first node, feedback information with respect to the resource allocation request, wherein the feedback information indicates the CoMP hypothesis selected by the second node.

5. A second apparatus, in a second node, for determining coordinated multipoint (CoMP)-based resource allocation with assistance of a first node, wherein the first node and the second node belong to the same CoMP cluster, the second apparatus comprising:

at least one processor; and at least one memory including computer program code, the at least one memory and the computer program code configured to, with the at least one processor, cause the second apparatus to at least:

receive a resource allocation request, with respect to measurement information transmitted by the second node, fed back by the first node, wherein the resource allocation request is for indicating a plurality of CoMP hypotheses from which the second node may select and resource information corresponding to all or a part of CoMP hypotheses in the plurality of CoMP hypotheses, respectively, and wherein all or the part of CoMP hypotheses in the plurality of CoMP hypotheses define dimensional condition(s) that identify circumstances under which the second node supports CoMP;

select a CoMP hypothesis from the plurality of CoMP hypotheses based on the resource information and/or status information of the second node; and transmit, to the first node, feedback information with respect to the resource allocation request, wherein the feedback information indicates the CoMP hypothesis selected by the second node.

6. The second apparatus according to claim 5, wherein the dimensional condition(s) that identify circumstances under which the second node supports CoMP include at least one of the following:

the second node supporting CoMP at designated dimension(s);

the second node supporting CoMP with partial scope(s) of the designated dimension.

7. The second apparatus according to claim 5, wherein the at least one memory and the computer program code are configured to, with the at least one processor, additionally at least cause the second apparatus to:

when it is determined based on the status information that the second node can support CoMP, for each CoMP hypothesis having corresponding resource information in the at least one CoMP hypothesis, determine performance gain that can be generated by performing coordinated transmission under this CoMP hypothesis; and compare all of the determined performance gains with a gain threshold to select a CoMP hypothesis.

8. The second apparatus according to claim 5, wherein the at least one memory and the computer program code are configured to, with the at least one processor, additionally at least cause the second apparatus to:

when it is determined to decline to perform coordinated transmission under any of the plurality of CoMP hypotheses based on the status information and/or the resource information, select a CoMP hypothesis for indicating that the second node currently declines to perform coordinated transmission.

9. A third apparatus, in a first node, for performing coordinated multipoint (CoMP)-based resource allocation for a second node, wherein the first node and the second node belong to the same CoMP cluster, the third apparatus comprising:

at least one processor; and at least one memory including computer program code, the at least one memory and the computer program code configured to, with the at least one processor, cause the third apparatus to at least:

receive a respective resource configuration request(s) transmitted by a respective second node(s) in a plurality of second nodes, wherein the respective resource configuration request transmitted is for indicating at least one CoMP hypothesis, which is preferable for the respective second node that transmitted the resource configuration request, of a serving cell of the second node that transmitted the resource configuration request and corresponding resource information, and/or at least one CoMP hypothesis of neighboring cell(s) of the serving cell and corresponding resource information, wherein all or a part of CoMP hypotheses in the at least one CoMP hypotheses define dimensional condition(s) that identify circumstances under which the second node supports CoMP;

determine a CoMP hypothesis and resource information for a serving cell of each second node in the plurality of second nodes based on the resource configuration request from the plurality of second nodes, respectively; and transmit, to the second node(s) that transmitted the resource configuration request, a respective CoMP hypothesis and resource information corresponding to its serving cell.

10. A communication system, comprising a third apparatus according to claim 9, and a fourth apparatus comprising:

at least one processor; and at least one memory including computer program code, the at least one memory and the computer program code configured to, with the at least one processor, cause the fourth apparatus to at least:

determine a resource configuration request based on CoMP decision-related information of the second node, wherein the resource configuration request is for indicating at least one CoMP hypothesis, which is relatively preferable to the second node, of a serving cell of the second node and corresponding resource information, and/or at least one CoMP hypothesis of neighboring cell(s) of the serving cell and corresponding resource information, wherein all or a part of CoMP hypotheses in the at least one CoMP hypothesis define the dimensional condition(s) when the second node supports CoMP, and a fifth transmitting module configured to transmit the resource configuration request to the first node and a sixth receiving module configured to receive the CoMP hypothesis and resource information fed back by the first node and perform corresponding operations.

11. A fourth apparatus, in a second node, for determining coordinated multipoint (CoMP)-based resource allocation with assistance of a first node, wherein the first node and the second node belong to the same CoMP cluster, the fourth apparatus comprising:

at least one processor; and at least one memory including computer program code, the at least one memory and the computer program code configured to, with the at least one processor, cause the fourth apparatus to at least:

determine a resource configuration request based on CoMP decision-related information of the second node, wherein the resource configuration request is for indicating at least one CoMP hypothesis, which is relatively preferable to the second node, of a serving cell of the second node and corresponding resource information, and/or at least one CoMP hypothesis of neighboring cell(s) of the serving cell and corresponding resource information, wherein all or a part of CoMP hypotheses in the at least one CoMP hypothesis define the dimensional condition(s) that identify circumstances under which the second node supports CoMP;

transmit the resource configuration request to the first node; and receive the CoMP hypothesis and resource information fed back by the first node and perform corresponding operations.

12. A method, in a first node, for coordinated multipoint (CoMP)-based resource allocation for a second node, wherein the first node and the second node belong to the same CoMP cluster, the method comprising:

a. selecting a plurality of CoMP hypotheses from among a first plurality of CoMP hypotheses based on measurement information reported by the second node, wherein all or a part of CoMP hypotheses in the first plurality of CoMP hypotheses define dimensional condition(s) that identify circumstances under which the second node supports CoMP;

b. transmitting a resource allocation request to the second node, wherein the resource allocation request is for indicating the selected plurality of CoMP hypotheses available from which the second node may make a subsequent selection and resource information corresponding to all or a part of the CoMP hypotheses in the selected plurality of CoMP hypothesis, respectively;

c. receiving feedback information from the second node with a response to the resource allocation request, and performing a corresponding operation, wherein the feedback information indicates a CoMP hypothesis selected by the second node.

13. A method, in a second node, for determining coordinated multipoint (CoMP)-based resource allocation with assistance of a first node, wherein the first node and the second node belong to the same CoMP cluster, the method comprising:

A. receiving a resource allocation request, with respect to measurement information transmitted by the second node, fed back by the first node, wherein the resource allocation request is for indicating a plurality of CoMP hypotheses from which the second node may select and resource information corresponding to all or a part of CoMP hypotheses in the plurality of CoMP hypotheses, respectively, and wherein all or the part of CoMP hypotheses in the plurality of CoMP hypothesis define dimensional condition(s) that identify circumstances under which the second node supports CoMP;

B. selecting a CoMP hypothesis from the plurality of CoMP hypotheses based on the resource information and/or status information of the second node; and C. transmitting, to the first node, feedback information with respect to the resource allocation request, wherein the feedback information indicates the CoMP hypothesis selected by the second node.

14. A method in a first node, for performing coordinated multipoint (CoMP)-based resource allocation for at least one second node, wherein the first node and the at least one second node belong to a same CoMP cluster, the method comprising:

receiving a respective resource configuration request transmitted by at least one second node in a plurality of second nodes, wherein the respective resource configuration request transmitted by a respective one of the at least one second node is for indicating at least one CoMP hypothesis of a serving cell of the respective second node and corresponding resource information, and/or at least one CoMP hypothesis of neighboring cell(s) of the serving cell and corresponding resource information, wherein all or a part of CoMP hypotheses in the at least one CoMP hypotheses define dimensional condition(s) that identify circumstances under which the second node supports CoMP;

determining a CoMP hypothesis and resource information for a serving cell of the at least one second node based on the resource configuration request, respectively;

transmitting, to the at least one second node, a CoMP hypothesis and resource information corresponding to its serving cell.

15. A method, in a second node, for determining coordinated multipoint (CoMP)-based resource allocation with assistance of the first node, wherein the first node and the second node belong to the same CoMP cluster, the method comprising:

determining a resource configuration request based on CoMP decision-related information of the second node, wherein the resource configuration request is for indicating at least one CoMP hypothesis of a serving cell of the second node and corresponding resource information, and/or at least one CoMP hypothesis of neighboring cell(s) of the serving cell and corresponding resource information, wherein all or a part of CoMP hypotheses in the at least one CoMP hypothesis define the dimensional condition(s) that identify circumstances under which the second node supports CoMP;

transmitting the resource configuration request to the first node;

receiving the CoMP hypothesis and resource information fed back by the first node and perform corresponding operations.

\* \* \* \* \*